US009711997B2

(12) United States Patent
Raghavan et al.

(10) Patent No.: US 9,711,997 B2
(45) Date of Patent: Jul. 18, 2017

(54) SYSTEM AND METHOD FOR STORING AND DISTRIBUTING DC POWER

(71) Applicant: Blue Clover Design, LLC, San Bruno, CA (US)

(72) Inventors: Arvind Raghavan, San Bruno, CA (US); Peter Staples, San Bruno, CA (US)

(73) Assignee: Blue Clover Design, LLC, San Bruno, CA (US)

( * ) Notice: Subject to any disclaimer, the term of this patent is extended or adjusted under 35 U.S.C. 154(b) by 295 days.

(21) Appl. No.: 14/639,915

(22) Filed: Mar. 5, 2015

(65) Prior Publication Data

US 2015/0256031 A1    Sep. 10, 2015

(51) Int. Cl.
| | |
|---|---|
| *A47B 37/00* | (2006.01) |
| *H02J 13/00* | (2006.01) |
| *H02J 1/06* | (2006.01) |
| *H02J 7/00* | (2006.01) |
| *H02J 7/34* | (2006.01) |
| *H02J 9/00* | (2006.01) |

(52) U.S. Cl.
CPC ............ *H02J 13/0003* (2013.01); *H02J 1/06* (2013.01); *H02J 7/0055* (2013.01); *H02J 7/0068* (2013.01); *H02J 7/34* (2013.01); *H02J 9/00* (2013.01); *Y10T 307/352* (2015.04)

(58) Field of Classification Search
CPC ........ H02J 13/0003; H02J 1/06; H02J 7/0068; H02J 7/0055; H02J 9/00; H02J 7/34; Y10T 307/352

USPC ....................................................... 108/50.02
See application file for complete search history.

(56) References Cited

U.S. PATENT DOCUMENTS

| | | | | | |
|---|---|---|---|---|---|
| 5,530,963 | A  * | 6/1996  | Moore | ................ | H04L 12/4604 370/351 |
| 5,606,920 | A  * | 3/1997  | Meyer | ................... | A47B 17/00 108/50.02 |
| 6,202,567 | B1 * | 3/2001  | Funk  | ...................... | A47B 21/06 108/50.01 |
| 7,223,123 | B2 * | 5/2007  | Brooks | .................. | A47B 21/06 439/577 |
| 7,278,360 | B2 * | 10/2007 | Griepentrog | ......... | A47B 83/001 108/50.02 |
| 7,975,624 | B2 * | 7/2011  | Henriott | ................. | A47B 21/00 108/50.02 |

(Continued)

*Primary Examiner* — Kenneth B Wells
(74) *Attorney, Agent, or Firm* — Jeffrey Schox

(57) ABSTRACT

A system and method for storing and distributing DC power, comprising: a first desk with a horizontal desktop surface and vertical support surfaces, batteries, a charging circuit with an AC to DC power converter, one AC power input channel, one DC power input channel, and DC power output channels; a second desk with a horizontal desktop surface and vertical support surfaces, batteries, a charging circuit with an AC to DC power converter, one AC power input channel, one DC power input channel, and DC power output channels; and electrical information processors adapted to the charging circuits to regulate and allocate DC power between batteries and DC power output channels within a chain of electrically connected desks by measuring and controlling charges and electric currents from charging circuits to batteries, from charging circuits to DC power output channels, and from batteries to DC output channels.

17 Claims, 12 Drawing Sheets

(56) References Cited

U.S. PATENT DOCUMENTS 8,061,864 B2 * 11/2011 Metcalf .................. A47B 21/00
307/150
8,937,407 B2 * 1/2015 Byrne ..................... H01F 38/14
307/104

* cited by examiner

10

SYSTEM AND METHOD FOR STORING AND DISTRIBUTING DC POWER

CROSS-REFERENCE TO RELATED APPLICATIONS

This application claims the benefit of U.S. Provisional Application No. 61/948,389 filed 5 Mar. 2014, which is incorporated in its entirety by this reference.

BACKGROUND

Electronic devices require power to function. This power can be delivered in the form of Direct Current (DC) power. Traditionally, Alternating Current (AC) power from 120-volt wall sockets are used to power electronic devices, and delivering power to designated locations, especially substantial distances from a wall outlet, requires extensive training, certification, and planning.

Thus, there is a need in the power storage and distribution field to create an improved and useful system and method for storing and distributing DC electric power.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
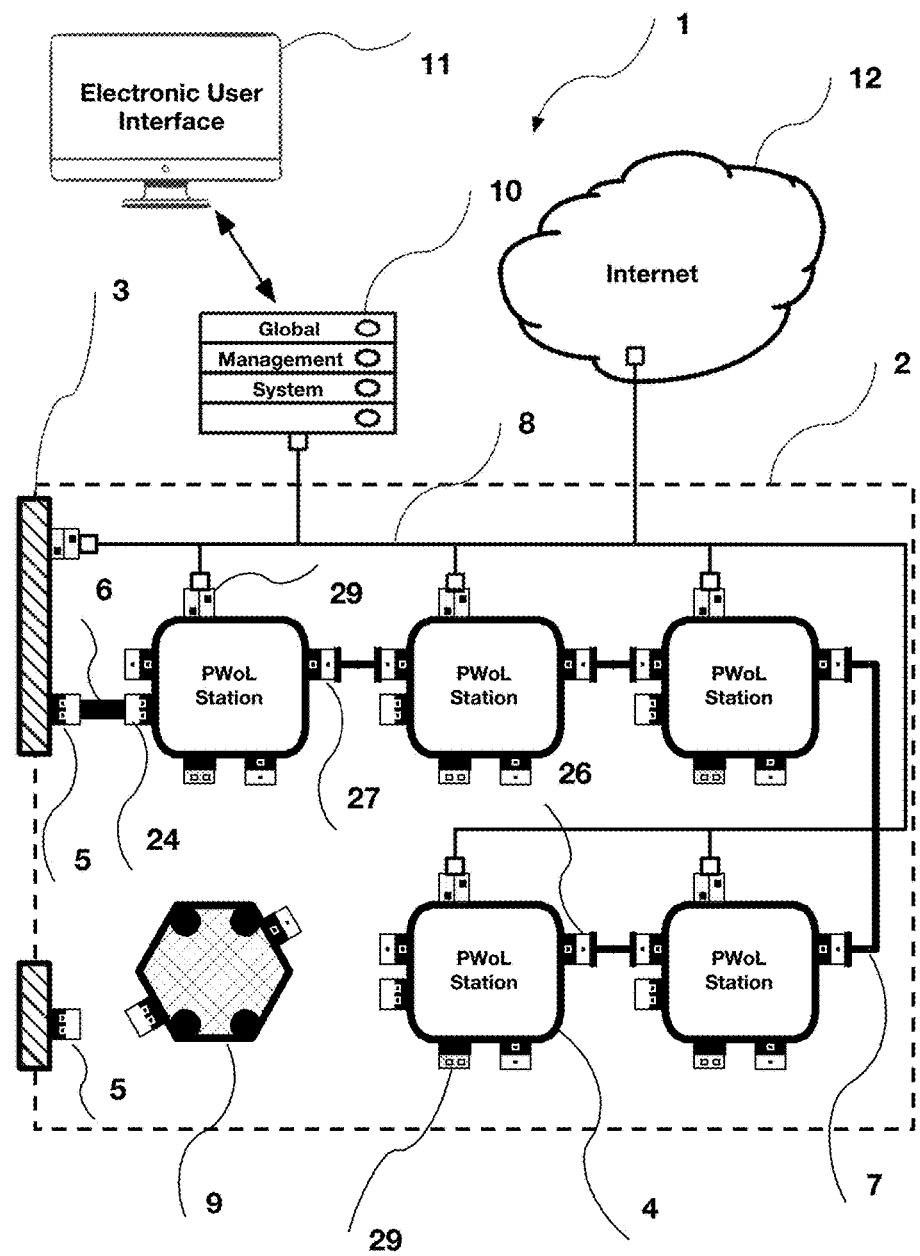
FIG. 1 is a schematic representation of the system for distributing DC electric power to users.
Figure 2:
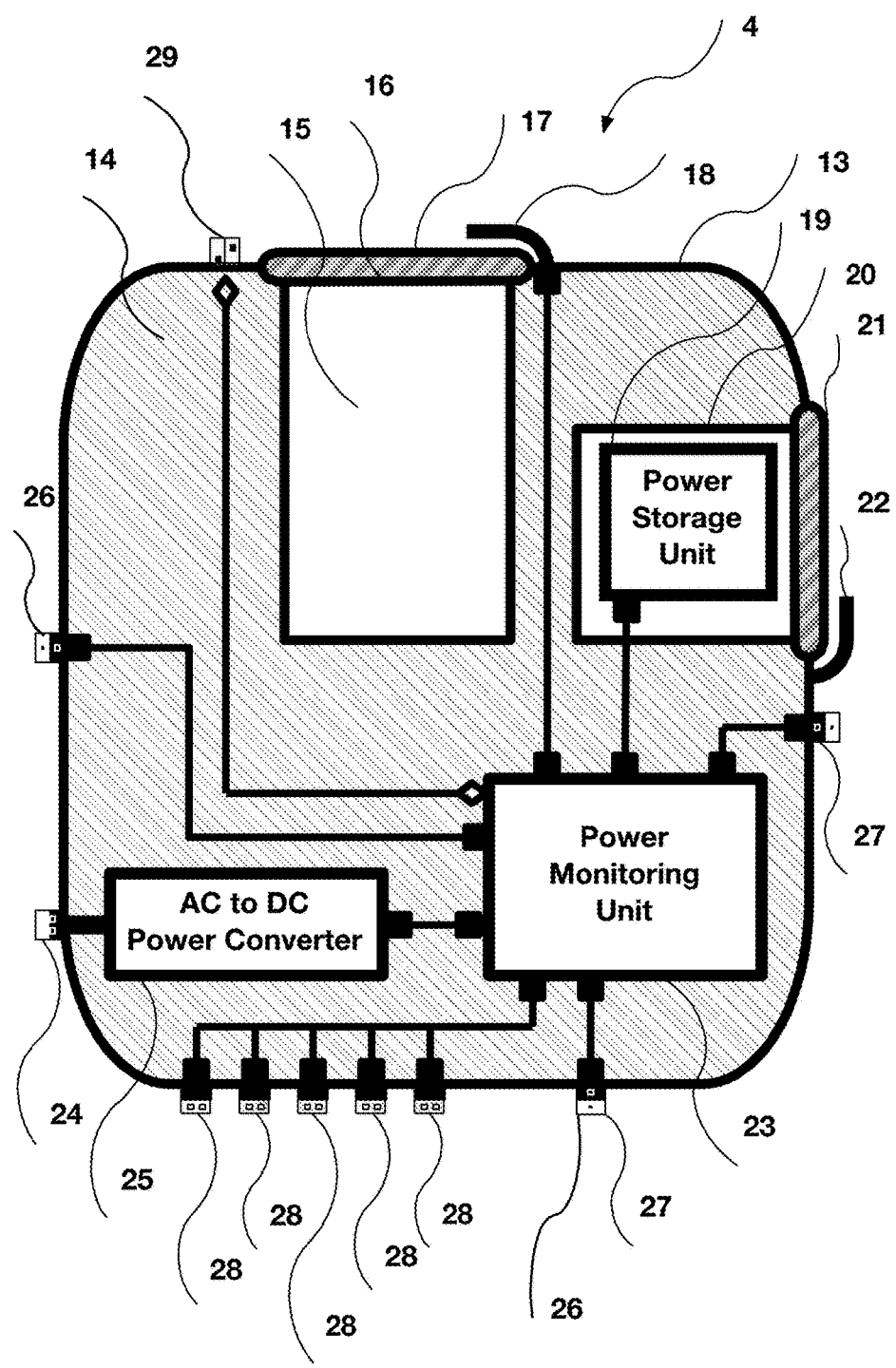
FIG. 2 is a schematic representation of a single modular personal work or leisure (PWoL) station.

As shown in FIG. 1 and FIG. 2, the system 1 for distributing DC electric power to users preferably comprises: a number of modular personal work or leisure (PWoL) stations 4; a number of DC transmission lines 7, where each DC transmission line 7 connects the DC output terminal 27 of a first PWoL station 4 to the DC input terminal 26 of a second PWoL station 4; a number of AC transmission lines 6, where each AC transmission line 6 connects an AC outlet 5 on a wall 3 in the room 2 and the AC input terminal 24 of a PWoL station 4; an auxiliary power cart 9; a communication bus 8 where the network connection 29 of each PWoL station 4 connects to; a global management system 10; and an electronic user interface 11. Each PWoL station 4 preferably comprises: a piece of furniture 13, a number of storage spaces 15, a network connection 29, a power storage unit 19 coupled to the piece of furniture 13, an AC input terminal 24, an AC to DC power converter 25, a DC input terminal 26, a number of DC output terminals 27 to transfer power to other PWoL stations 4, a number of DC user terminals 28, for charging of user devices, and a power monitoring unit 23, that functions to monitor the remaining energy in the power storage unit 19, control the charging of the power storage unit 19, and control the flow of power between terminals. The DC input terminals 26 and DC output terminals 27 are preferably bi-directional.

The system 1 functions to distribute DC electric power to users occupying stations inside a building space without interruption, in a cost effective manner. The system 1 functions to distribute power to users through interconnected semi-autonomous PWoL stations 4, each of which has a power storage unit 19 and a power monitoring unit 23. Energy enters the system 1 through stations 4 connected to an AC outlet 5 on a wall 3 of the room 2 the system occupies. It is converted to DC and is stored in the power storage unit 19 of those PWoL stations 4. Energy flows to the rest of the PWoL stations 4 through DC electrical connections when required for specific stations, in order to provide uninterrupted power to users, or when it is cost effective to do so. The system 1 functions to distribute DC power to users inside a big room 2 without hazardous wires running inside the room. The system 1 functions to allow reorganising of the PWoL stations 4 without requiring re-wiring hazardous wires. The global management system 10 functions to monitor the electric energy pricing, and decide when it is cost effective to fully charge all the PWoL stations 4 of the system 1. The global management system 10 also functions to monitor the remaining energy level in the power storage unit 19 of each PWoL station 4 and instruct specific PWoL stations 4 to receive or provide power to neighbouring stations, or charge from an AC outlet 5. The auxiliary power cart 9 functions to provide emergency power to a specific PWoL station 4 in the case the PWoL station 4 has no remaining energy in its power storage unit 19 and cannot receive power from any other source. The electronic user interface 11 functions to provide information to users about the availability of PWoL stations 4, and allows them to reserve a PWoL station 4 for a limited amount of time. The global management system 10 functions to instruct stations to provide power to the DC user terminal 28 to only identified users who have reserved the PWoL station 4 through the electronic user interface 11. The electronic user interface 11 further functions to provide control of the storage space from the user occupying the station, by selectively locking and unlocking the storage space through the electronic user interface 11. The electronic user interface 11 functions to rent stations to users for a limited amount of time, when the user pays a specific monetary amount.

Each PWoL station 4 preferably comprises a piece of furniture 13; a network connection 29; a power storage unit 19 coupled to the piece of furniture 13; an AC input terminal 24; an AC to DC power converter 25; a DC input terminal 26; a number of DC output terminals 27 to transfer power to other PWoL stations 4; a number of DC user terminals 28, for charging of user devices; and a power monitoring unit 23 that functions to monitor the remaining energy in the power storage unit 19, control the charging of the power storage unit 19, and control the flow of power between terminals. The DC input terminals 26 and DC output terminals 27 are preferably bi-directional.

The PWoL station 4 is a semi-autonomous unit, inside a bigger system, that provides DC electric power to a user occupying the station through several DC user terminals 28. The PWoL station 4 functions to provide this power from an internal power storage unit 19. Inside the PWoL station 4, a power monitoring unit 23 functions to maintain the stored energy of the power storage unit 19 at sufficient level to provide the user with uninterrupted power in a distributed manner. The PWoL station 4 functions to charge the power storage unit 19 from an AC input terminal 24 that is connected to an AC outlet 5 on a wall 3 inside a room 2. Also, the PWoL station 4 functions to charge the power storage unit 19 from the surplus of energy of another PWoL station 4, through the DC input terminal 26. The PWoL station 4 functions to aid the charging of the power storage unit 19 of another PWoL station 4 by providing power through a DC output terminal 27. The PWoL station 4 functions to decide how to route power from and to the power storage unit 19 using the power monitoring unit 23, which functions collectively with the rest of the system 1, to optimise the power distribution process while providing uninterrupted power to each user.

The piece of furniture 13 functions to provide a user space to perform a task or rest, while providing her with outlets to charge her devices. The piece of furniture 13 preferably comprises storage spaces 15. Each storage space 15 preferably comprises a cavity 16 located inside the piece of furniture body 14, a cover 17 for the user to access the cavity 16 from outside the piece of furniture body 14, and a electronically controlled lock 18 that restricts the opening of the cavity cover 17 and therefore access to the interior of the cavity 16. The electronically controlled lock 18 is connected to the power monitoring unit 23, and controlled through the electronic user interface 11, by the user who has currently reserved the PWoL station 4.

The piece of furniture 13 is preferably an office desk, where the user performs her work. Preferably the storage space 15 of the desk is a desk drawer. Alternatively, the piece of furniture 13 is preferably a couch. Alternatively, the piece of furniture 13 is preferably a seat.

The network connection 29 functions to exchange information and instructions with the rest of system 1. The network connection 29 is preferably an ethernet network connection. Alternatively, the network connection 29 is preferably a USB connection. Alternatively, the network connection 29 is preferably a firewire connection. Alternatively, the network connection 29 is preferably a WiFi connection. Alternatively, the network connection 29 is preferably a Bluetooth connection.

The power storage unit 19 functions to store electrical power and supply it when required. The power storage unit 19 is preferably a lithium-ion battery. Alternatively, the power storage unit 19 is preferably a lead-acid battery. Alternatively, the power storage unit 19 is preferably a molten-salt battery. Alternatively, the power storage unit 19 is preferably a nickel-cadmium battery. Alternatively, the power storage unit 19 is preferably a fuel cell.

The power storage unit 19 is preferably coupled to the piece of furniture 13, in such a way that allows for easy removal. The piece of furniture 13 has preferably a cavity 20, inside which the power storage unit 19 is placed. The piece of furniture 13 has preferably an opening on its surface, to allow for removal of the power storage unit 19. The piece of furniture 13 also preferably comprises a cover 21 with a lock 22, that functions to allow for only controlled access and removal of the power storage unit 19 from the piece of furniture 13.

The AC input terminal 24 functions to import AC electrical power to the PWoL station 4. The AC input terminal 24 is preferably the standard IEC 320 C14 type plug. The AC input terminal 24 preferably further comprises a switch to electrically isolate the PWoL station 4.

The AC to DC power converter 25 functions to convert AC electrical power to DC electrical power. The AC input is preferably 120V, 60 Hz. Alternatively the AC input is preferably 230V, 50 Hz. The DC output voltage is preferably 5V. Alternatively the DC output voltage is preferably 10V.

Figure 3:
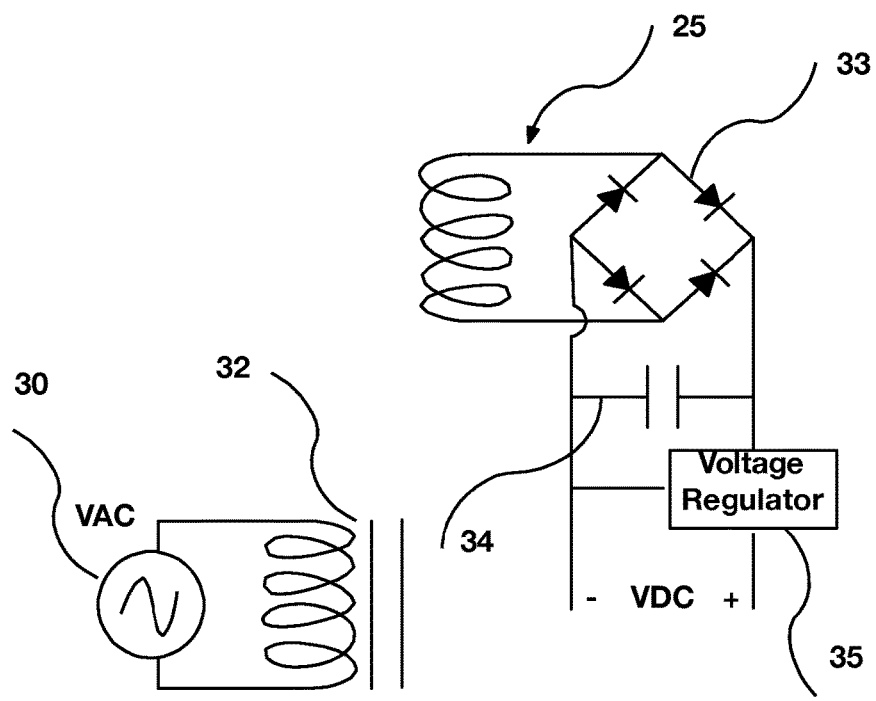
FIG. 3 is a schematic representation of an AC to DC converter.

As shown in FIG. 3, the AC to DC power converter 25 preferably comprises an AC input terminal 30, a DC output terminal 31, a transformer 32, a diode bridge rectifier 33, a filter capacitor 34, and a voltage regulator 35. The transformer 32 functions to transform the high voltage AC input to a low voltage AC output. The diode bridge rectifier 33 functions to fully rectify the low voltage AC. The filter capacitor 34 functions to smoothen the rectified signal. The voltage regulator 35 functions to provide a stable DC output voltage.

As shown in FIG. 2, the DC input terminal 26 functions to input DC electric power to a PWoL station 4 from another PWoL station 4. The DC input terminal 26 is preferably a USB terminal with only the ground and DC voltage signals connected. The DC input terminal 26 is preferably a firewire terminal with only the ground and DC voltage signals connected.

The DC output terminal 27 functions to output DC electric power from a PWoL station 4 to another PWoL station 4. The DC output terminal 27 is preferably a USB terminal with only the ground and DC voltage signals connected. The DC output terminal 27 is preferably a firewire terminal with only the ground and DC voltage signals connected. The DC input terminals 26 and DC output terminals are preferably bi-directional.

The DC user terminal 28 functions to output DC electric power from a PWoL station 4 to the user of the PWoL station 4. The DC user terminal 28 is preferably a USB terminal with only the ground and DC voltage signals connected. The DC user terminal 28 is preferably a firewire terminal with only the ground and DC voltage signals connected.

Figure 4:
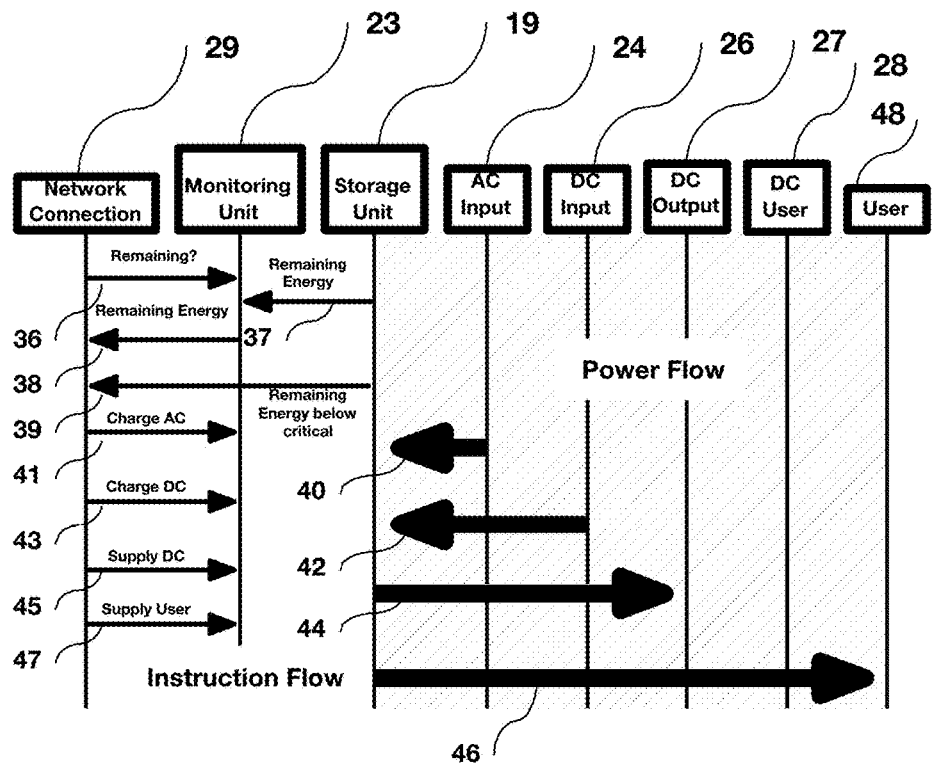
FIG. 4 is a flowchart representation of the power monitoring unit actions.

As shown in FIG. 4, the power monitoring unit 23 preferably functions to monitor the level of remaining energy 37 in the power storage unit 19 and send this information 38 through the network connection 29, either when queried 36 through the network connection 29, or when the level of remaining energy in the power storage unit 19 drops below a critical limit 39. The power monitoring unit 23 also preferably functions to enable charging 40 of the power storage unit 19 through the AC input terminal 24 and the AC to DC power converter, when instructed to do so 41 through the network connection 29. The power monitoring unit 23 also preferably functions to enable charging 42 of the power storage unit 19 through the DC input terminal 26 connected to another PWoL station, when instructed to do so 43 through the network connection 29. The power monitoring unit 23 also preferably functions to provide power 44 to a DC output terminal 27 connected to another PWoL station, when instructed to do so 45 through the network connection

29. The power monitoring unit 23 also preferably functions to provide power 46 to a user 48, through the DC user terminals 28 when instructed to do so 47 through the network connection 29.

Figure 5:
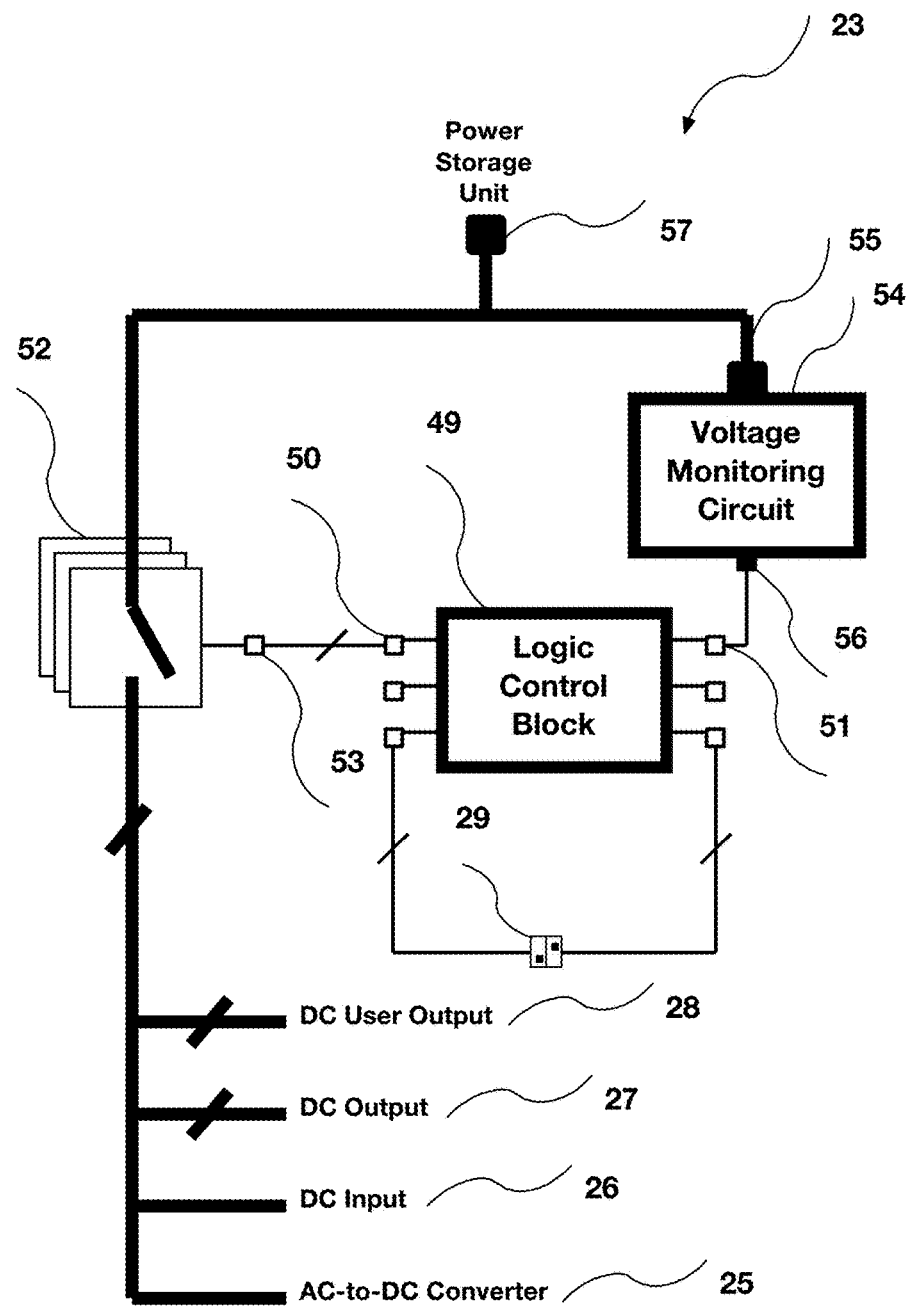
FIG. 5 is a schematic representation of the power monitoring unit.

As shown in FIG. 5, the functionality of the power monitoring unit 23 is preferably implemented as a logic control block 49 that reads a signal from a number of input terminals 50, and controls a number of output terminals 51.

The logic control block 49 is preferably implemented as a software program that is executed on a micro-controller unit, that reads a signal from a number of input terminals, and controls a number of output terminals. The micro-controller unit has preferably a network port that is connected to the network connection 29 of the PWoL station.

Figure 6:
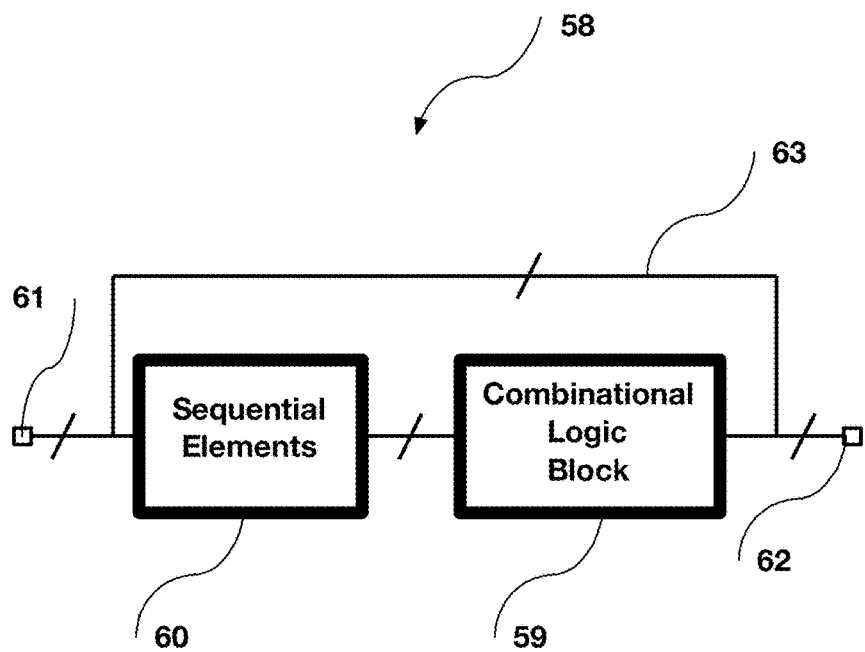
FIG. 6 is a schematic representation of the state machine implementation of the logic control block in the power monitoring unit.

Alternatively, as shown in FIG. 6, the logic control block is preferably implemented as a state machine 58 comprising a number of input terminals 61, a number of output terminals 62, a combinational logic block 59, a number of sequential elements 60, and a feedback loop 63. Certain terminals connect to the network connection of the PWoL station.

As shown in FIG. 5, each output terminal 51 controls the switch control terminal 53 of an electronically controlled electrical switch 52. The electronically controlled electrical switch 52 opens or closes an electrical circuit depending on the voltage at its switch control terminal 53. An electronically controlled electrical switch 52 preferably isolates the AC power from the AC input terminal. Other electrical switches preferably control individually the flow of DC power between the power storage unit and the DC input terminal 26, and between the power storage unit and each DC output terminal 27, between the power storage unit and each DC user terminal 28. The remaining energy in the power storage unit is preferably monitored through a voltage monitoring circuit 54. The voltage monitoring circuit 54 preferably has an input terminal 55 that connects to the terminal 57 of the power storage unit. The voltage monitoring circuit 54 preferably has an output terminal 56 that connects to an input terminal 50 of the logic control block 49, to signal a low level of remaining energy in the power storage unit.

As shown in FIG. 1, the DC transmission lines 7 function to connect the DC output terminal 27 of a first PWoL station 4 to the DC input terminal 26 of a second PWoL station 4. The DC transmission lines 7 are preferably USB cables. Alternatively the DC transmission lines 7 are preferably Firewire cables.

The AC transmission lines 6 function to connect the AC input terminal 24 of a PWoL station 4 to an AC outlet 5. The AC transmission lines 6 are preferably standard AC cables, having a IEC 320 C13 plug in one end, and a NEMA 5-15P plug in the other end.

Figure 7:
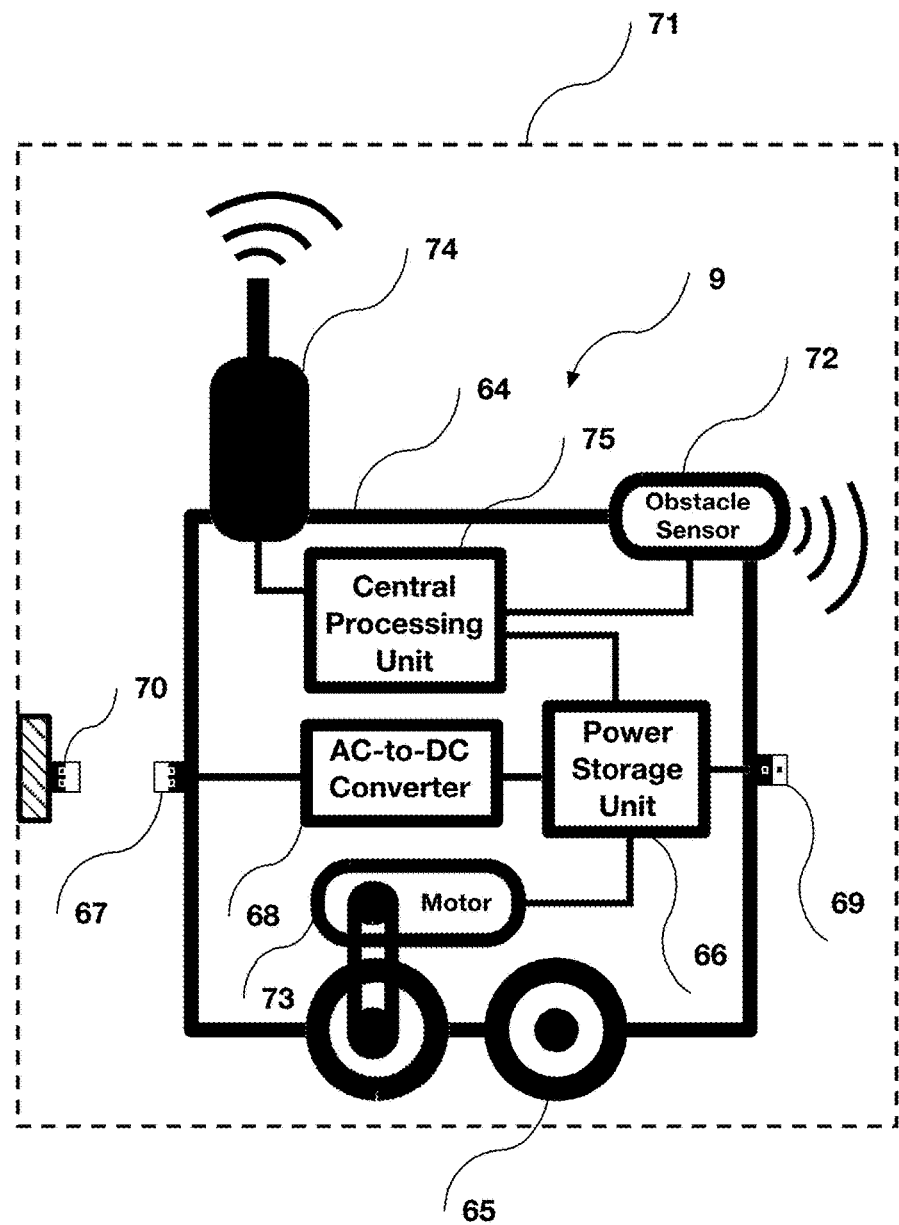
FIG. 7 is a schematic representation of the auxiliary power cart.

The communication bus 8 functions to carry messages between the network connection 29 of all PWoL stations 4 and the global management system 10. The communication bus 8 is preferably an Ethernet network. Alternatively the communication bus 8 is preferably an WiFi network. Alternatively the communication bus 8 is preferably an Bluetooth network. As shown in FIG. 7, the auxiliary power cart 9 preferably comprises a movable cart 64 with wheels 65, a power storage unit 66 that functions to store electrical power, an AC input terminal 67 that functions to input AC power from a wall AC plug 70, an AC-to-DC converter 68 that functions to convert AC power to DC and charge the power storage unit 66, and a DC output terminal 69 that functions to provide power to the PWoL station requiring emergency power.

The auxiliary power cart 9 functions to provide emergency power to a specific PWoL station, in the case when the PWoL station has no remaining energy in its power storage unit 19 and cannot receive power from any other source. When a PWoL station requires power, a user disconnects the AC input terminal 67 of the auxiliary power cart 9 from its charging station 71, moves the auxiliary power cart 9 to the PWoL station, and connects the DC output terminal 69 of the auxiliary power cart 9 to the DC input terminal of the PWoL station. When the auxiliary power cart 9 is no longer required, the user disconnects the DC output terminal 69 of the auxiliary power cart 9 from DC input terminal of the PWoL station, moves the auxiliary power cart 9 back to its original position, and connects the AC input terminal 67 of the auxiliary power cart 9 to its charging station 71.

The auxiliary power cart 9 is preferably a robot, that preferably further comprises obstacle sensors 72, electrical motors 73 coupled to the wheels 65, a wireless network connection 74, and a central processing unit 75 that controls the movement of the robot. When a PWoL station requires power, a message is sent through the wireless network connection 74 to inform the robot of the PWoL station's location. The auxiliary power cart 9 disconnects its AC input terminal 67 from its charging station 71, moves to the PWoL station, and connects its DC output terminal 69 to the DC input terminal of the PWoL station. When the auxiliary power cart 9 is no longer required, it disconnects its DC output terminal 69 from the DC input terminal of the PWoL station, moves back to its original position, and connects its AC input terminal 67 to its charging station 71.

Figure 8:
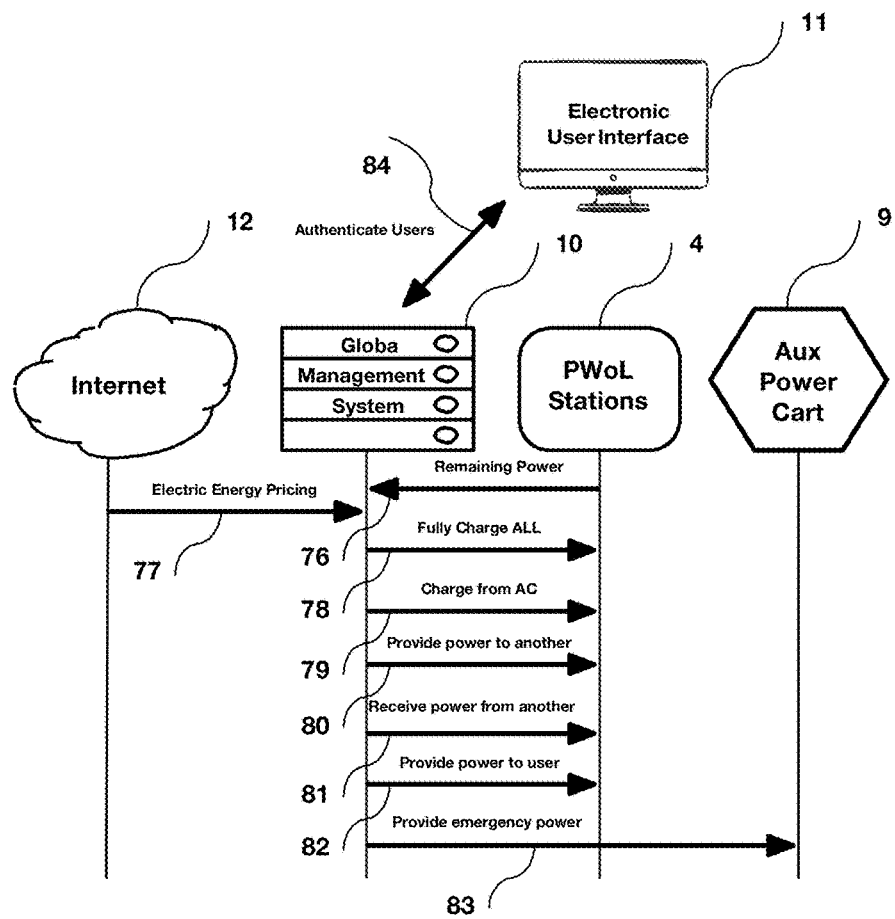
FIG. 8 is a flowchart representation of the global management system actions.

As shown in FIG. 8, the global management system 10 functions to monitor the electric energy pricing 77, and decide when it is cost effective to fully charge 78 all the PWoL stations 4 of the system. The global management system 10 also functions to monitor the remaining energy level 76 in the power storage unit of each PWoL station 4 and instruct specific PWoL stations 4 to receive 81 or provide 80 power to neighbouring stations, or charge 79 from an AC outlet. The global management system 10 functions to instruct stations to provide power 82 to the DC user terminal to only identified users 84, who have reserved the PWoL station 4 through the electronic user interface 11. The global management system 10 functions to provide emergency power to a PWoL station 4 that has no remaining energy in its power storage unit and cannot receive power from any other source, by instructing 83 the auxiliary power cart 9 to go and connect to a specific PWoL station 4.

As shown in FIG. 1, the global management system 10 preferably comprises a server, and a software program, running on the server. The server is preferably connected to the internet 12, to monitor electric power pricing. The server is preferably located inside the room where the system 1 is deployed, and is connected to the communication bus 8, in order to communicate with the all the PWoL stations 4. Alternatively the server is preferably located in a remote location, and connects to the communication bus 8 of a system 1 through the internet. The global management system 10 is preferably monitoring and servicing more than one system 1 concurrently, that are deployed on remote locations.

The electronic user interface 11 functions to provide information to users about the availability of PWoL stations 4, and allows them to reserve a PWoL station 4 for a limited amount of time. The global management system 10 functions to instruct stations to provide power to the DC user terminal 28 to only identified users, who have reserved the PWoL station 4 through the electronic user interface 11. The electronic user interface 11 further functions to provide control of the storage space from the user occupying the station, by selectively locking and unlocking the storage space through the electronic user interface 11. The electronic user interface 11 functions to rent stations to users for a limited amount of time, when the user pays a specific monetary amount.

The electronic user interface 11 preferably comprises an availability reporting section, that displays the availability of each PWoL station; a reservation section, that allows the user to reserve a PWoL station for a limited amount of time; and a PWoL control section to lock or unlock the electronically lockable storage spaces of the piece of furniture. The electronic user interface 11 is preferably a web page. Alternatively, the electronic user interface 11 is preferably a smartphone application.

In one preferred embodiment of the invention, the system 1 is deployed in an office space. The piece of furniture of the PWoL station 4 is an office desk, and the storage space of the piece of furniture is a number of drawers. The system 1 is used to provide power to workers who use low power devices such as laptops, tablets, and smartphones.

In another preferred embodiment of the invention, the system 1 is deployed in a collaboration space. The piece of furniture of the PWoL station 4 is an office desk, and the storage space of the piece of furniture is a number of drawers. The sys-tem 1 is used to provide office space for rent to people who occasionally need to use an office space, and who use low power devices such as laptops, tablets, and smartphones. The electronic user interface 11 is used to manage free desks, reservations and payments of desk usage time.

In another preferred embodiment of the invention, the system 1 is deployed in an airport waiting hall. The piece of furniture of the PWoL station 4 is a couch, suitable for use in airport waiting halls. The system 1 is used to provide power at the seating position, to passengers who use low power devices such as laptops, tablets, and smartphones, as they wait for their flight. Additionally each couch is a WiFi hotspot. The electronic user interface 11 is used to rent power time, along with high speed internet connection.

In another preferred embodiment of the invention, the system 1 is deployed in a train. The piece of furniture of the PWoL station 4 is a chair, suitable for use in a train. The system 1 is used to provide power at the seating position, to passengers who use low power devices such as laptops, tablets, and smartphones, as they wait to arrive at their destination. The electronic user interface 11 is used to rent power time, along with high speed internet connection. In this preferred embodiment, there is no AC input terminal and no AC-to-DC power converter. A high voltage DC to intermediate voltage DC converter is centrally located in the train, to supply intermediate voltage DC power in each train carriage. Inside each carriage an intermediate voltage DC to low voltage DC converter is used to convert the input voltage, to the voltage the PWoL stations use. The power is then distributed between PWoL stations using the DC transmission lines 7.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 9:
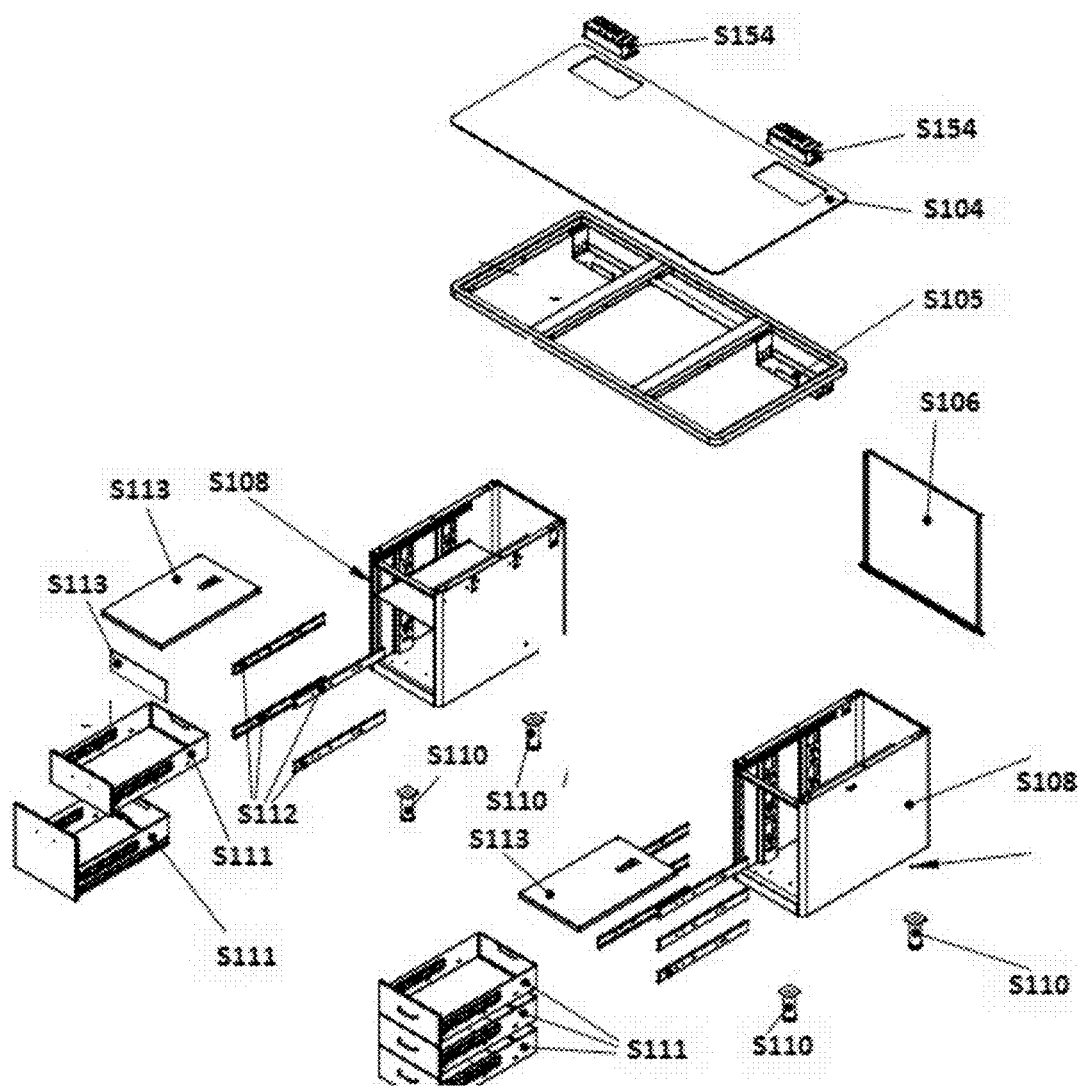
FIG. 9 is a schematic of a first preferred embodiment of the invention.
Figure 10:
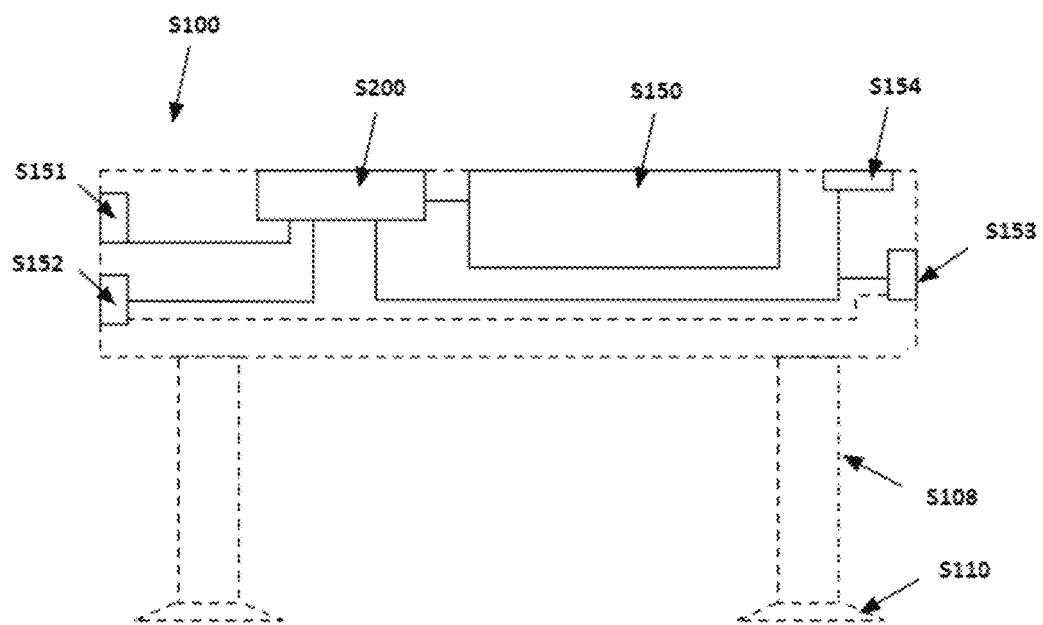
FIG. 10 is a side view of the preferred embodiment of FIG. 9.

As shown in FIGS. 9 and 10, the preferred embodiment of the invention includes a desk S100 and an electrical information processor S200. The desk S100 includes a horizontal desktop surface S104, vertical support surfaces S108, a power storage unit S150, a unit inlet S151, a primary power inlet S152, a unit outlet S153, and device outlets S154. The electrical information processor S200 is a single structure that is coupled to the desk S100 from inside. Alternatively, it can be coupled to the desk S100 from the outside, such as by attaching it to a vertical support surface S108.

The desk functions as the structure and casing of the system and method for storing and distributing DC power. The horizontal desktop surface S104 defines a plane that is used to support an electronic device such as a laptop or tablet personal computer and is manufactured from glass. Alternatively, it can be manufactured from wood, aluminum, or another suitable material. The horizontal desktop surface S104 also has openings for a series of device outlets S154 to be accessed from outside the desk.

The horizontal desktop surface is supported by vertical support surfaces S108 including a top support S105, back panel S106, and feet S110. The vertical support surfaces S108 are manufactured from aluminum alloy. Alternatively, they can be manufactured from plastic, steel, or another suitable material. The vertical support surfaces S108 are hollow and contain drawers S111, drawer sliders S112, and dividers S113. Alternatively, the vertical support surfaces S108 can be hollow and contain electrical wiring. The vertical support surfaces S108 are further supported by feet S110 that are used to limit the movement of the preferred embodiment when subjected to a force. These feet S100 are manufactured from rubber and can alternatively be manufactured from another material with suitable friction properties. Alternatively, the feet S110 can be the bottom surfaces of the vertical support surfaces S108 themselves.

In one preferred embodiment, the desk contains a power storage unit S150, a unit inlet S151, a primary power inlet S152, a unit outlet S153, and device outlets S154. The power storage unit S150 functions as an electrical capacitor that stores electric charge and energy. It is comprised of rechargeable batteries and contains a voltage divider that measures and reports its charge. The unit inlet S151 functions as a DC power input that electrically connects one desk to the unit outlet S153 of another desk. The primary power inlet S152 functions as an AC power input to connect the same vertical supporting surface S108 of the desk to a power source. The unit outlet S153 is located on another vertical supporting surface S108 of the desk. The device outlets S154 are located on the horizontal desktop surface S104 of the desk and are female ports of a two-pronged electrical connection. Alternatively, they can be male connectors of a two-pronged electrical connection, USB female ports, and another suitable port and connector. The device outlets S154 are connected to laptops, mobile phones, tablets, and other devices that require an electric charge. In a second preferred embodiment of the invention, the unit inlet S151, primary power inlet S152, unit outlet S153, and device outlets S154 can be located on the same vertical supporting surface S108 of the desk or the horizontal desktop surface S104.

The electrical information processor S200 functions to regulate and allocate DC power between the power storage unit S150, unit inlet S151, primary power inlet S152, unit outlet S153, and device outlets S154. It is electrically connected to these components by wiring manufactured from materials such as copper, gold, and other suitable material. The electrical information processor S200 functions to regulate and allocate DC power between the power storage unit S150 and device outlets S154. It monitors the charge level of the power storage unit S150 and draws power from the primary power input S152 and unit inlet S151 to fully charge the power storage unit S150. It then distributes power from the primary power input S152 and unit inlet S151 to the device outlets S154 in accordance with the measured power demand. Finally, it allocates power from the power storage unit S150 to the device outlets S154 if the power from the primary power inlet S151 and unit inlet S152 is not sufficient. In another embodiment of this invention, the electrical information processor S200 can function through its procedure in a different order, such as distributing power from the primary power input and unit inlet to the device outlets before charging the power storage unit.

Figure 11:
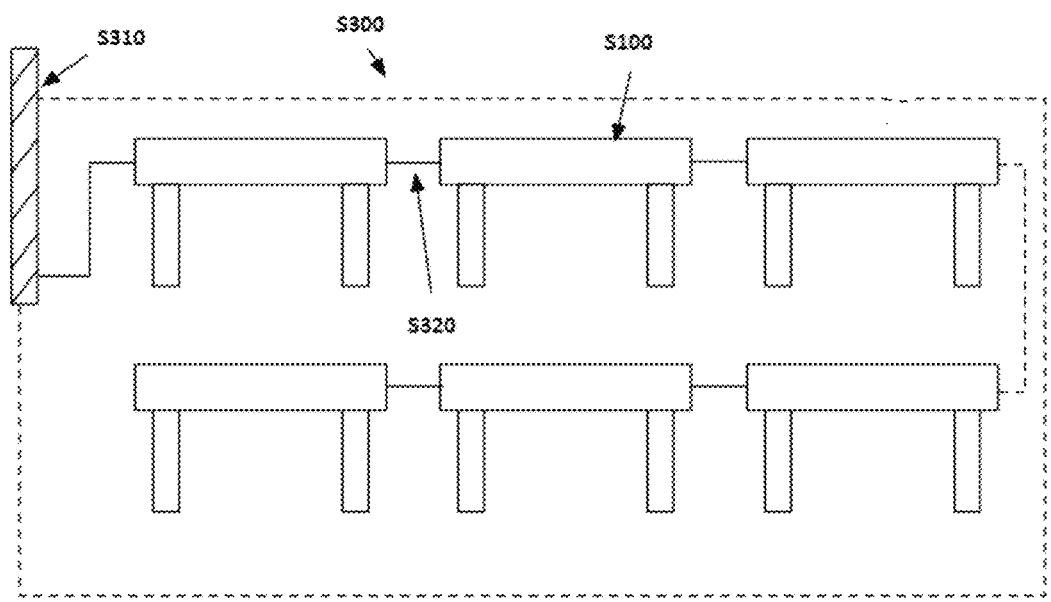
FIG. 11 is a diagram of one arrangement of the preferred embodiment.

As shown in FIG. 11, individual embodiments of the invention are electrically connected to form a chain S300. In the preferred embodiment, a first desk S100 is electrically connected via its primary power input to a United States standard 120 volts wall socket S310. The first desk then converts the AC power to DC power with its AC to DC converter. The unit outlet of the first desk is then electrically connected to a unit inlet of a second desk with wire S320. This process continues to form a chain of desks that function on DC power.

The electrical information processor S200 is manufactured in a way that it measures charges and electric currents among all other electrical components, inlets, and outlets within the chain of desks. The electrical information processor S200 is also manufactured in a way that it communicates with and controls the level of DC power to all other electrical information processors and power storage units within the chain of desks. The power and data connection of each electrical information processor S200 to the power storage units S150, other electrical information processors, inlets, and outlets of each desk allows this network of processors to regulate and allocate DC power across every electrical component in the chain of desks in accordance with its measured power demands.

Figure 12:
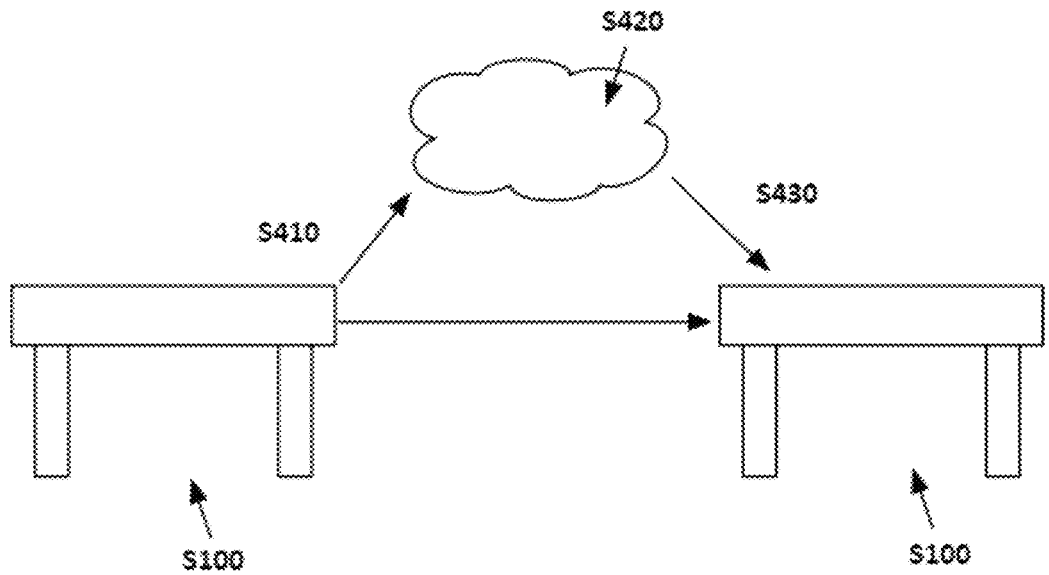
FIG. 12 is a diagram of one arrangement of the preferred embodiment with a management system.
Figure 13:
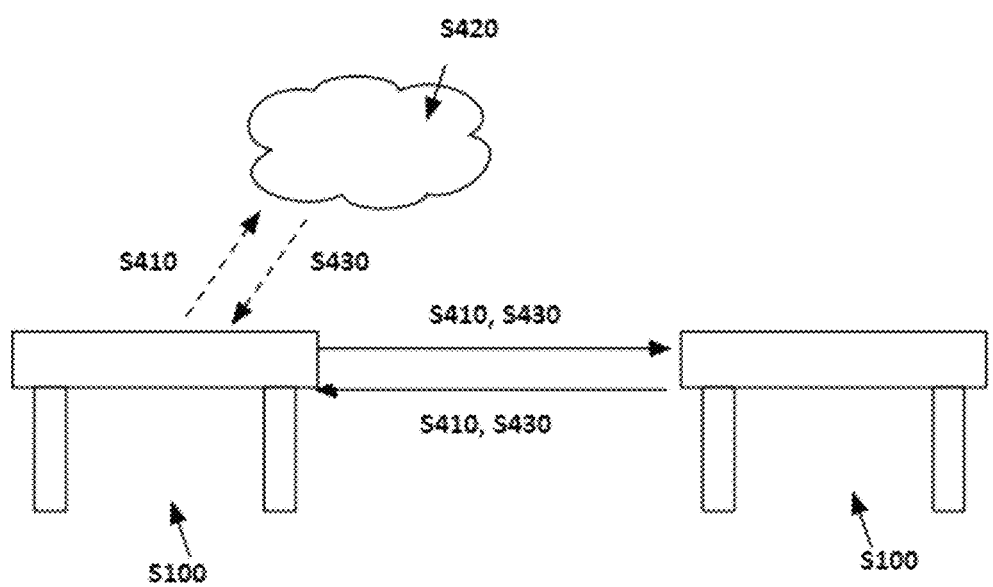
FIG. 13 is a diagram, similar to the diagram of FIG. 12, showing a variation of the preferred embodiment with a management system.

As shown in FIGS. 12 and 13, another embodiment of the invention is a cloud management system that acts as the allocator and regulator of the DC power. In this embodiment, electrical information S410 regarding the charges and electric currents within a chain of desks is sent via wired connection from an electrical information processor to the cloud management system S420 that interprets and processes the information and sends backs operating instructions S430 for allocating and regulating DC power. Alternatively, the information and operating instructions can be sent via wireless communication. The cloud management system S420 can also be a single consolidated management system.

As shown in FIG. 12, operating instructions S430 are sent from the cloud management system to each electrical information processor S200 in the chain of desks separately. FIG. 13 represents an alternative embodiment of the invention where the cloud management system S420 communicates with one processor in the chain of desks, and this processor relays the instructions it receives to other processors in the chain of desks. Alternatively, the cloud management system S420 can communicate with a select sequence of processors, such as in an alternating fashion.

Figure 14:
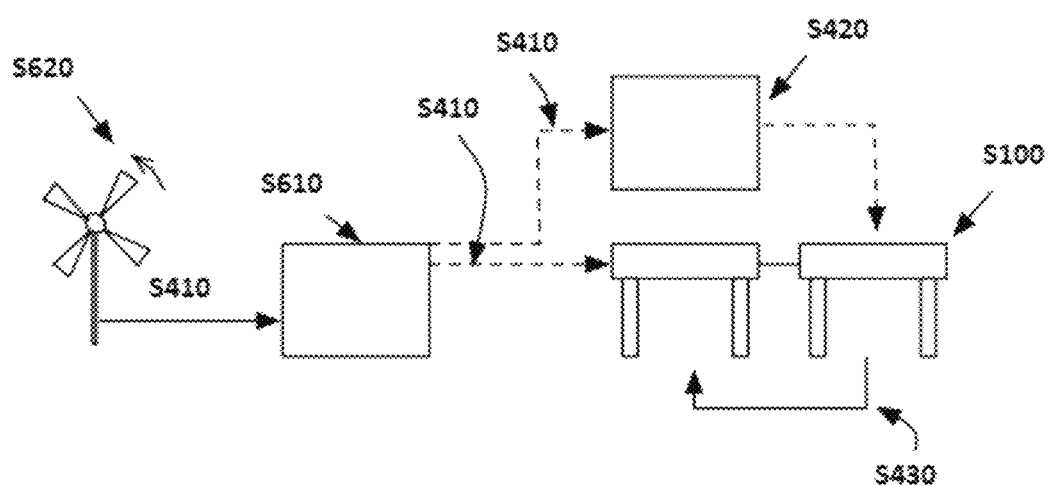
FIG. 14 is a diagram, similar to the diagram of FIG. 13, showing a variation of the preferred embodiment.

As shown in FIG. 14, a power grid S610 drawing power from a windmill renewable energy source S620 is connected to the unit inlet of the first desk in a chain of desks. The power grid S610 communicates with both the electrical information processor of the first desk and the cloud management system of FIGS. 12 and 13. Alternatively, the energy can be generated from a hydroelectric, solar-powered, or another alternative energy source. The power grid S610 can also communicate with each electrical information processor separately, as the cloud management system does in FIG. 12.

In one variation, the system of distributing DC electrical power to users includes: a plurality of modular personal work or leisure (PWoL) stations, each PWoL station having: a desk, a network connection, a plurality of drawers, each drawer having a lock that can be electronically controlled through the network connection, a battery coupled to the desk, an AC input terminal, an AC-to-DC power converter, a DC input terminal, a number of DC output terminals to transfer power to other PWoL stations, a number of DC user terminals for charging of user devices, and a power monitoring unit that: monitors the level of remaining energy in the battery and sends this information through the network connection, when queried through the network connection, or when the level of remaining energy in the battery drops below a critical limit, enables charging of the battery through the AC input terminal and AC-to-DC power converter, when instructed to do so through the network connection, enables charging of the battery through the DC input terminal connected to another PWoL station, when instructed to do so through the network connection, provides power to a DC output terminal connected to another PWoL station when instructed to do so through the network connection, enables power to the DC user terminals when instructed to do so through the network connection, and disables power to the DC user terminal when instructed to do so through the network connection; a plurality of DC transmission lines, each DC transmission line connecting the DC output terminal of a first PWoL station to the DC input terminal of a second PWoL station; a plurality of AC transmission lines, each AC transmission line connecting an AC outlet and an AC input terminal of a PWoL station; an auxiliary battery cart robot, that moves and electrically connects to a specific PWoL station to provide DC power, when instructed to do so by the global management system; a communication bus where the network connection of each PWoL station connects to; a global management system that: communicates with the internet and each PWoL station through the communication bus, monitors grid power prices and instructs PWoL stations to charge the battery through the AC input terminal and AC-to-DC power converter, and monitors the power level of the battery and consumption in each PWoL station, and instructs PWoL stations to provide DC power through DC output terminal, or charge their battery through the DC input terminal; and an electronic user interface, that is a web page or a smartphone application, the electronic user interface having: an availability reporting section that displays the availability of each PWoL station, a reservation section that allows the user to reserve a PWoL station for a limited amount of time, and a PWoL control section to lock or unlock the drawers of the desk.

In a second variation, the modular personal work or leisure (PWoL) station includes: a piece of furniture; a network connection; a power storage unit coupled to the piece of furniture; an AC input terminal; an AC-to-DC power converter; a DC input terminal; a number of DC output terminals to transfer power to other PWoL stations; a number of DC user terminals, for charging of user devices; and a power monitoring unit that monitors the level of remaining energy in the power storage unit and sends this information through the network connection when queried through the network connection, or when the level of remaining energy in the power storage unit drops below a critical limit, enables charging of the power storage unit through the AC input terminal and AC-to-DC power converter, when instructed to do so through the network connection, enables charging of the power storage unit through the DC input terminal connected to another PWoL station, when instructed to do so through the network connection, and provides power to a DC output terminal connected to another PWoL station when instructed to do so through the network connection. A PWoL station, wherein the power storage unit is a lithium-ion battery. Coupling of the power storage unit to the piece of furniture can be done using a lock. The power monitoring unit can further: enable power to the DC user terminals when instructed to do so through the network connection; and disable power to the DC user terminal when instructed to do so through the network connection. The piece of furniture can be a desk.

In a third variation, a system of distributing DC electrical power to users can include a plurality of modular personal work or leisure (PWoL) stations as discussed above, a plurality of DC transmission lines, each DC transmission line connecting a DC output terminal of a first PWoL station to the DC input terminal of a second PWoL station; a plurality of AC transmission lines, each AC transmission line connecting an AC outlet to an AC input terminal of a PWoL station; an auxiliary power movable cart that can be moved to, and connected to a PWoL station when emergency power is required from that station; a communication bus where the network connection of each PWoL station connects to; a global management system that communicates with the internet and each PWoL station through the communication bus, monitors grid power prices and instructs PWoL stations to charge the power storage unit through the AC input terminal and AC-to-DC power converter, and monitors the power level of the power storage unit and consumption in each PWoL station and instructs PWoL stations to provide DC power through DC output terminal or charge their power storage unit through the DC input terminal; and an electronic user interface, the electronic user interface having: an availability reporting section that displays the availability of each PWoL station, and a reservation section, that allows the user to reserve a PWoL station for a limited amount of time. The PWoL station can additionally include a plurality of drawers, each drawer having a lock that can be electronically controlled through the network connection. The electronic user interface can be a web page or a smartphone application.

In a fourth variation, a system of distributing DC power to users comprises: a plurality of modular personal work or leisure (PWoL) stations, each PWoL station having: a piece of furniture, a network connection, a power storage unit coupled to the piece of furniture, an AC input terminal, an AC-to-DC power converter, a DC input terminal, a number of DC output terminals to transfer power to other PWoL stations, a number of DC user terminals, for charging of user devices, and a power monitoring unit, that monitors the level of remaining energy in the power storage unit and sends this information through the network connection, when queried through the network connection, or when the level of remaining energy in the power storage unit drops below a critical limit, enables charging of the power storage unit through the AC input terminal and AC-to-DC power converter, when instructed to do so through the network connection, enables charging of the power storage unit through the DC input terminal connected to another PWoL station, when instructed to do so through the network connection, and provides power to a DC output terminal connected to another PWoL station when instructed to do so through the network connection; a plurality of DC transmission lines, each DC transmission line connecting the DC output terminal of a first PWoL station to the DC input terminal of a second PWoL station; a plurality of AC transmission lines, each AC transmission line connecting an AC outlet and an AC input terminal of a PWoL station; an auxiliary power cart; a communication bus where the network connection of each PWoL station connects to; and a global management system that: communicates with the internet and each PWoL station through the communication bus, monitors grid power prices and instructs PWoL stations to charge the power storage unit through the AC input terminal and AC-to-DC power converter, and monitors the power level of the power storage unit and consumption in each PWoL station and instructs PWoL stations to provide DC power through DC output terminal or charge their power storage unit through the DC input terminal. The auxiliary power cart can be a robot that moves and electrically connects to a specific PWoL station to provide DC power when instructed to do so by the global management system. The system can further comprise an electronic user interface, the electronic user interface comprising: an availability reporting section, that displays the availability of each PWoL station; a reservation section, that allows the user to reserve a PWoL station for a limited amount of time; and a PWoL control section to lock or unlock the electronically lockable storage spaces of the piece of furniture. The system can further comprise an electronic user interface, the electronic user interface comprising: an availability reporting section that displays the availability of each PWoL station; a reservation section that allows the user to reserve a PWoL station for a limited amount of time; and a PWoL control section to lock or unlock the electronically lockable storage spaces of the piece of furniture. The piece of furniture can be a desk. Coupling the power storage unit to the piece of furniture in a PWoL station can be done using a lock. In a specific variation, the PWoL station further includes drawers, each drawer having a lock that can be electronically controlled through the network connection of the PWoL station. The electronic user interface can be a web page or a smartphone application. In this variation, an associated method of distributing DC electrical power to users can include the steps of: enabling and disabling supply of power through a DC terminal to a user occupying a station; monitoring the level of remaining energy in the power storage unit of each station; monitoring current grid power pricing; enabling and disabling charging of the power storage unit of a station through the AC input terminal and AC-to-DC power converter, depending on the level remaining energy in the power storage unit and current grid power price; enabling and disabling transfer of DC power from one station to another station, depending on the level remaining energy in the power storage unit and current grid power price; and locking and unlocking the storage spaces. The method can further include the step of a user moving and connecting the auxiliary power cart to a station requiring emergency power. The method can further include the step of a robot moving and connecting the auxiliary power cart to a station requiring emergency power.

What is claimed is:

1. A DC power distribution system, comprising:
    a first desk with a horizontal desktop surface and vertical support surfaces, at least one battery, a charging circuit with an AC to DC power converter, at least one AC power input channel, at least one DC power input channel, and at least one DC power output channel;
    a second desk with a horizontal desktop surface and vertical support surfaces, at least one battery, a charging circuit with an AC to DC power converter, at least one AC power input channel, at least one DC power input channel, and at least DC power output channels; and
    at least one electrical information processor connected to the charging circuits with an AC to DC power converter to regulate and allocate DC power between at least one battery and at least one DC power output channel within a chain of electrically connected desks, including a first desk and a second desk, by measuring and controlling charges and electric currents from charging circuits with an AC to DC power converter to at least one battery, from charging circuits to at least one DC power output channel, and from at least one battery to at least one DC output channel.

2. A DC power distribution system, comprising:
    a first desk with a charging circuit with an AC to DC power converter, at least one battery, at least one AC power input channel, at least one DC power input channel, and at least one DC power output channel;
    a second desk electrically connected to the first desk with a second charging circuit with an AC to DC power converter, at least one battery, at least one AC power input channel, at least one DC power input channel, and at least one DC power output channel; and
    with an AC to DC power converter to regulate and allocate DC power between at least one battery and at least one DC power output channel within a chain of electrically connected desks.

3. A DC power distribution system as in claim 2, wherein the first and second desk each comprise a horizontal desktop surface and vertical support surfaces.

4. A DC power distribution system as in claim 3, wherein the first and second desk each comprise at least one AC power input channel and at least one DC power input channel.

5. A DC power distribution system as in claim 4, wherein at least one AC power input channel and at least one DC power input channel face outward from the same vertical support surface of the desk, a single DC power output channel faces outward from another vertical support surface of the desk, and at least one DC power output channel faces outward from the horizontal desktop surface.

6. A DC power distribution system as in claim 2, wherein at least one electrical information processor are controlled by operating instructions from a cloud management system that receives electrical charge information from the chain of desks.

7. A DC power distribution system as in claim 6, wherein a first electrical information processor in the first desk sends operating instructions to a second electrical information processor in the second desk.

8. A method for storing and distributing DC power among a chain of electrically connected desks, comprising:
    providing a first desk with a first charging circuit for converting AC power to DC power;
    providing an electrical connection between the first charging circuit and at least one battery, at least one AC power input channel, at least one DC power input channel, and at least one DC power output channel;
    providing a second desk with a second charging circuit for converting AC power to DC power;
    providing an electrical connection between the second charging circuit and at least one battery, at least one AC power input channel, at least one DC power input channel, and at least one DC power output channel;
    providing an electrical connection between the first charging circuit to the second charging circuit; and
    responsive to operating instructions for regulating and allocating DC power within a chain of electrically connected desks, measuring and controlling charges and electric currents between charging circuits, at least one battery, and at least one DC power output channel, wherein the chain of electrically connected desks comprise the first desk and the second desk.

9. A method for storing and distributing DC power as in claim 8, wherein the first desk is the only desk in the chain of desks that converts AC power to DC power.

10. A method for storing and distributing DC power as in claim 9, wherein the first desk converts AC power from an electrical grid powered by a renewable energy source.

11. A method for storing and distributing DC power as in claim 8, wherein the operating instructions for regulating and allocating DC power are measured and controlled by a network of processors that receives charge information from at least one battery and at least one DC power output channel within the chain of electrically connected desks.

12. A method for storing and distributing DC power as in claim 11, wherein the operating instructions regulate and allocate DC power by supplying DC power from the charging circuits to at least one battery or from the charging circuits to the at least one DC power output channel or from at least one battery to the at least one DC output channel.

13. A method for storing and distributing DC power as in claim 12, wherein the operating instructions have priority in that order.

14. A method for storing and distributing DC power as in claim 8, wherein operating instructions for regulating and allocating electrical power are automatically controlled by a cloud management system that receives electric charge information and sends the operating instructions to charging circuits within a chain of desks, including the first desk and the second desk.

15. A method for storing and distributing DC power as in claim 14, wherein a first charging circuit sends operating instructions to a second charging circuit within a chain of desks, including a first desk and a second desk.

16. A method for storing and distributing DC power as in claim 8, wherein operating instructions for regulating and allocating DC power are manually controlled from the desks, including the first desk and the second desk.

17. A method for storing and distributing DC power as in claim 8, wherein operating instructions for regulating and allocating DC power are manually controlled from a wireless device.

* * * * *